Dec. 28, 1954　　　R. C. CASSELMAN ET AL　　　2,697,961
PHOTOGRAPHIC APPARATUS

Filed July 12, 1951　　　　　　　　　　　　　　4 Sheets-Sheet 2

INVENTORS
Robert C. Casselman
and
BY　Vaito K. Eloranta

Brown and Mikulka
ATTORNEYS

Dec. 28, 1954   R. C. CASSELMAN ET AL   2,697,961
PHOTOGRAPHIC APPARATUS
Filed July 12, 1951   4 Sheets-Sheet 3

INVENTORS
Robert C. Casselman
and
BY Kaito K. Eloranta

Brown and Mikulka
ATTORNEYS

Dec. 28, 1954   R. C. CASSELMAN ET AL   2,697,961
PHOTOGRAPHIC APPARATUS

Filed July 12, 1951   4 Sheets-Sheet 4

INVENTORS
Robert C. Casselman
BY Vaito K. Eloranta

Brown and Mikulka
ATTORNEYS

United States Patent Office 2,697,961
Patented Dec. 28, 1954

2,697,961

PHOTOGRAPHIC APPARATUS

Robert C. Casselman, Auburndale, and Vaito K. Eloranta, Boston, Mass., assignors to Polaroid Corporation, Cambridge, Mass., a corporation of Delaware Application July 12, 1951, Serial No. 236,404

9 Claims. (Cl. 88—24)

This invention relates to photography and more particularly to novel apparatus for supporting both a camera and an object to be photographically reproduced.

An object of the present invention is to provide a novel copying stand for relatively positioning an object to be photographically copied with respect to a camera carried by said copying stand.

Other objects of the invention are to provide a copying stand of the above type having portable construction; to provide a novel means for illuminating an object to be photographically copied; and to provide a precision copying stand having simple and economical construction.

Other objects of the present invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The apparatus herein specifically disclosed is a portable copying stand which comprises means for supporting a photograph, drawing or similar object to be photographically reproduced or copied, means for securing a camera above said object, means for illuminating said object and means for varying the distance between said object and the lens of said camera and for constraining said object in substantial parallelism with the focal surface of said camera.

Figure 1:
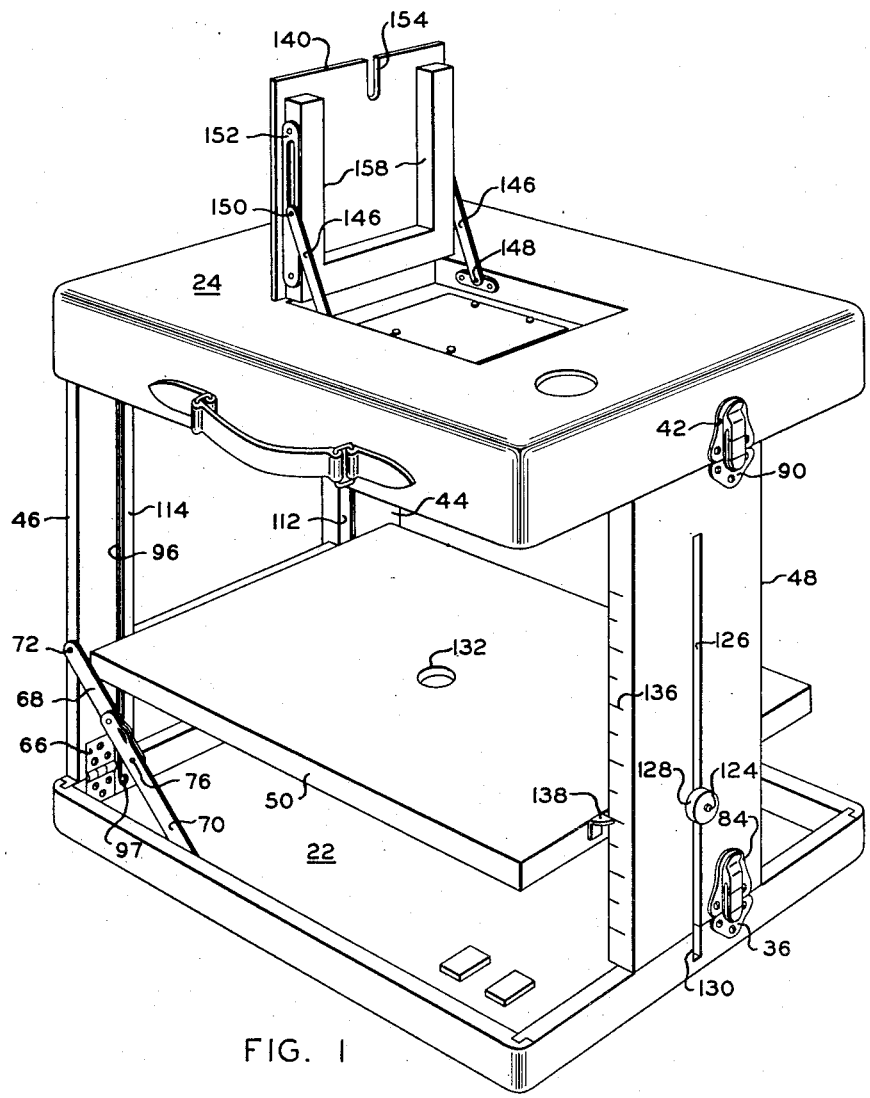
Figure 1 is a perspective view of one preferred copying stand embodying the present invention and showing a lid mounted on legs which extend perpendicularly from a base.

When the preferred copying stand of Fig. 1 is in collapsed condition, substantially all of its working components may be enclosed within the compact container formed by lower mounting means or base 22 and upper mounting means or lid 24. Base 22 includes a flat, substantially rectangular, bottom wall and a side wall extending along the periphery of said bottom wall. Lid 24 includes a flat, substantially rectangular, top wall and a side wall extending along the periphery of said top wall. When the free edges of the side walls of base 22 and of lid 24 are aligned and juxtaposed, a portable compact container is formed. Suitable locking means, such as suitcase bolts, are provided to securely fasten the aligned juxtaposed side walls of base 22 and lid 24 together. Male or locking means 32, 34 and 36 (Figs. 4 and 5) are secured to the side wall of base 22, and female or reciprocal locking means 38, 40 and 42 (Fig. 2) are secured to the side wall of lid 24. Locking means 32, 34 and 36 are adapted to interlock with reciprocal locking means 38, 40 and 42, respectively, to fasten the aligned juxtaposed side walls of base 22 and lid 24 together.

Figures 4, 5:
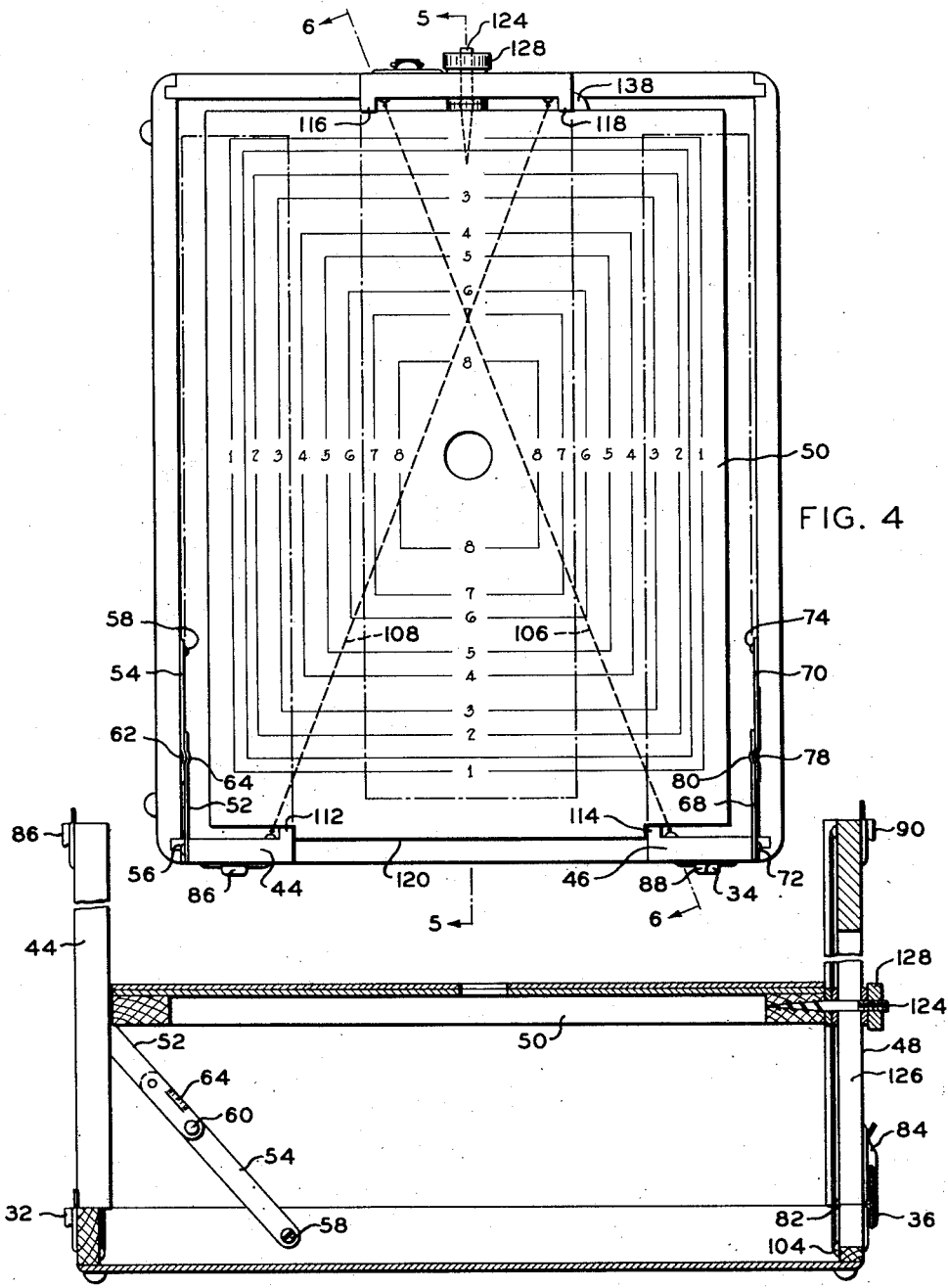
Fig. 4 is a top plan view of the copying stand of Fig. 1 with the lid removed.
Fig. 5 is a cross section of Fig. 4 taken substantially along the line 5—5.

Pivoted legs 44, 46 and 48 (Fig. 1), when in collapsed or horizontal position, are confined within the container formed by said base 22 and said lid 24 and, when in extended or vertical position, support lid 24 on their free or upper ends and slidably mount easel 50 on which the object to be photographically copied may be secured. First leg 44 is pivoted at its lower extremity to the side wall of base 22 as by means of a hinge (not shown) and, as viewed in Fig. 1, is adapted to pivot from collapsed or horizontal position to extended or vertical position. First leg 44 may be secured in vertical position by such means as links 52 and 54 (Figs. 4 and 5). In the present embodiment, link 52 is pivoted to first leg 44 as at 56 and link 54 is pivoted to the side wall of base 22 as at 58. Links 52 and 54 are pivoted to each other as at 60. Link 54 is provided with projection 62 which is adapted to snap into recess 64 of link 52 to secure first leg 44 in vertical position. Second leg 46 is pivoted at its lower extremity to the side wall of base 22 as by means of hinge 66 (Fig. 1) and, as viewed in Fig. 1, is adapted to pivot from collapsed or horizontal position to extended or vertical position. Second leg 46 may be secured in vertical position by such means as links 68 and 70 (Figs. 1 and 4). In the present embodiment, link 68 is pivoted to second leg 46 as at 72 and link 70 is pivoted to the side wall of base 22 as at 74. Links 68 and 70 are pivoted to each other as at 76. Link 70 is provided with projection 78 which is adapted to snap into recess 80 of link 68 to secure second leg 46 in vertical position. Third leg 48 is pivoted at its lower extremity to the side wall of base 22 as by means of a pair of hinges, a portion of one of which is shown at 82 in Fig. 5, said hinges 82 being positioned at opposite edges of said third leg 48. As viewed in Fig. 5, third leg 48 is adapted to pivot from collapsed or horizontal position to extended or vertical position. Locking means 36 on the side wall of base 22, in addition to being adapted to interlock with reciprocal locking means 42 on lid 24, is adapted also to interlock with reciprocal locking means 84 which is positioned adjacent the lower extremity of third leg 48 to secure said third leg in vertical position.

The upper or free extremities of the first, second and third legs are flat and are adapted to abut against portions of the free edge of the side wall of lid 24 to support lid 24 above base 22. Lid 24 may be secured to the free ends of said legs by reciprocal locking means 38, 40 and 42 which, in addition to being adapted to interlock with locking means 32, 34 and 36, respectively, on base 22, are adapted also to interlock with locking means at the free ends of said first, second and third legs. At the free end or upper extremity of first leg 44 is a locking means 86 (Figs. 4 and 5), which is similar to locking means 32 on base 22 and which is adapted to interlock with reciprocal locking means 38 of lid 24 when first leg 44 is in vertical position. Likewise, the free end or upper extremity of second leg 46 carries locking means 88 (shown partially broken away in Fig. 4), which is similar to locking means 34 and which is adapted to interlock with reciprocal locking means 40 on lid 24 when second leg 46 is in vertical position. Similarly, the free end or upper extremity of third leg 48 carries locking means 90, which is similar to locking means 36 and which is adapted to interlock with reciprocal locking means 42 when third leg 48 is in vertical position. When legs 44, 46 and 48 are thus secured in vertical position and lid 24 is thus secured on the upper extremities of said legs, a sturdy frame or stand is formed, the lid 24 of which is adapted to rigidly support a copying camera, and the legs of which are adapted to slidably mount easel 50 upon which an object to be copied may be affixed.

Easel 50, on which an object to be photographically copied may be mounted, is slidable along the first, second and third legs when said legs are in extended or vertical position so that the distance between the object to be photographically copied and a camera positioned on said lid may be varied. In order that a photographic copy be undistorted, it is desirable that the plane of an object to be copied be substantially parallel to the focal surface of the copying camera. The means by which the desired parallelism is accomplished in the preferred embodiment of the present invention is a series of flexible members or lines which not only constrain the easel to which said object is affixed in parallelism with the focal surface of said camera but which also enable the operator to collapse the easel and legs into portable condition simply by juxtaposing the easel 50 on said base 22 and folding said legs over the upper surface of said easel. When lid 24 is rigidly attached, as described above, to the upper extremities of the first, second and third legs 44, 46 and 48, the copying stand is in operating condition and, by means of the aforementioned flexible members, easel 50 may be moved perpendicularly to said base in order to vary the distance between the easel and the lens of a camera positioned on the lid.

Figure 6:
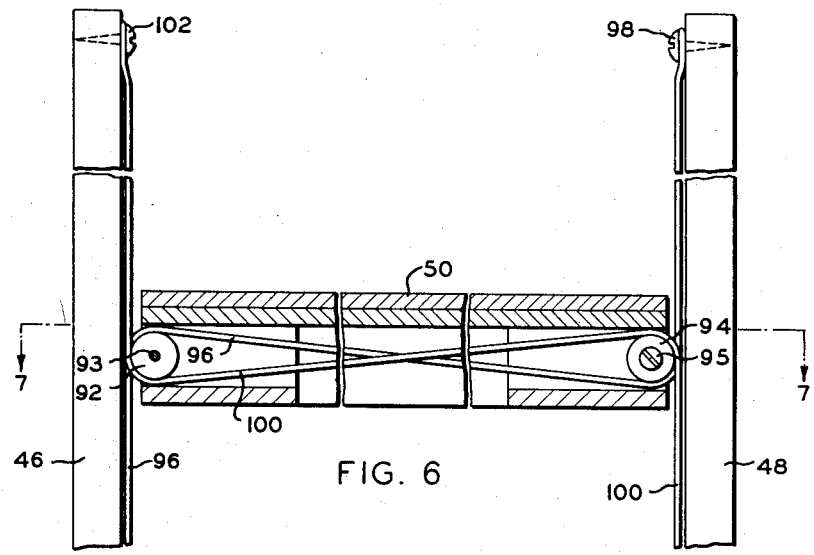
Fig. 6 is a diagrammatic fragmentary view of the means by which the easel of the copying stand of Fig. 1 is moved along said legs.
Figure 7:
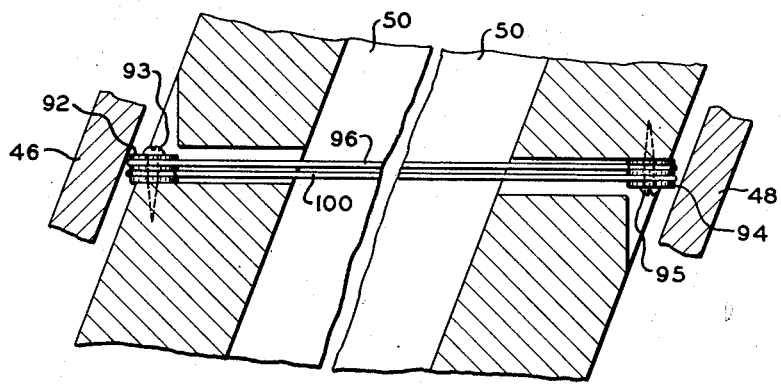
Fig. 7 is a fragmentary cross section of Fig. 6 taken substantially along the line 7—7.

As is best shown in Figs. 6 and 7, easel 50 rotatably mounts sheave 92, as at 93, adjacent second leg 46 and rotatably mounts sheave 94, as at 95, adjacent one of the edges of third leg 48. Each sheave 92 and 94 has two peripheral grooves for the reception of two flexible members or lines. Flexible member 96 is attached to the lower extremity of second leg 46, as by screw 97 (Fig. 1), and extends along a surface of said second leg to one of the peripheral grooves of sheave 92. From sheave 92, flexible member 96 extends across easel 50 to one of the peripheral grooves in sheave 94, thence extends upwardly along an edge of third leg 48 and is attached to the upper extremity of said third leg as by means of screw 98. Flexible member 100 is attached to the upper extremity of second leg 46, as by means of screw 102, and extends along a surface of second leg 46 to the other of the peripheral grooves in sheave 92. From sheave 92, flexible member 100 extends across easel 50 to the other one of the grooves in sheave 94, thence extends downwardly along said one of the edges of third leg 48 and is attached to the lower extremity of third leg 48 as by means of screw 104 (Fig. 5).

Viewing Fig. 4, flexible members 96 and 100 extend from the top and bottom of second leg 46, respectively, substantially along dotted line 106 and thence to the bottom and top, respectively, of third leg 48. Third and fourth flexible members (not shown), similar to first and second flexible members 96, 100, are provided for first leg 44 and the edge of the third leg 48 opposite the edge along which flexible members 96, 100 extend. Thus, a third flexible member extends from the upper extremity of first leg 44 to one of the grooves in a third sheave (not shown) which is rotatably mounted on easel 50 adjacent said first leg 44. From said third sheave, said third flexible member extends across easel 50 substantially along the dotted line 108 of Fig. 4 to one of the peripheral grooves of a fourth sheave (not shown) which is positioned adjacent the edge of third leg 48 that is opposite the edge along which flexible members 96, 100 extend. Said third flexible member thence extends downwardly along the third leg 48 and is attached to the lower extremity of third leg 48. A fourth flexible member (not shown) extends from the lower extremity of first leg 44 upwardly along the surface of first leg 44, is received in the other one of the peripheral grooves of the third sheave, extends substantially along dotted line 108, as shown in Fig. 4, is received in the other one of the peripheral grooves of the fourth sheave, thence extends upwardly along the third leg 48 and is attached to the upper extremity of third leg 48. To eliminate any tendency of the flexible members to escape from their respective grooves, sheave 92 is substantially parallel to sheave 94 and the third sheave is substantially parallel to the fourth sheave.

The first, second and third legs are provided with means which, when said legs are in vertical position, prevent horizontal motion of the easel as it moves perpendicularly to said base. In the present embodiment, motion of easel 50 longitudinally of base 22 is substantially prevented by means of rails 112 and 114 on first leg 44 and second leg 46, respectively, and by rails 116 and 118 at opposite edges of third leg 48, the opposite ends of easel 50 being adapted to ride along the aforementioned rails. Easel 50 is provided with extension 120 (Fig. 4) which is adapted to ride between rails 112 and 114. As easel 50 is moved perpendicularly to base 22 along said first, second and third legs, rails 112 and 114 are substantially in continuous contact with extension 120, said rails 112 and 114 thereby substantially preventing horizontal motion of easel 50 transversely of base 22. Bolt 124, which extends from an end of easel 50 through slot 126 in third leg 48, is adapted to ride in said slot 126 as easel 50 is being moved perpendicularly to base 22 and thus helps to prevent horizontal motion of easel 50 transversely of base 22. Lock nut 128 meshes with the threaded shank of bolt 124 to enable an operator to lock the easel 50 at a desired height.

The pivotal axes of the first, second and third legs, the flexible members, the side walls of base 22 and easel 50 are so constructed and arranged that when easel 50 is juxtaposed on the bottom wall of base 22, the first, second and third legs may be pivoted to horizontal position. In order to permit juxtaposition of easel 50 on the bottom wall of base 22, that portion of the side wall of base 22 adjacent third leg 48 is provided with a slot 130 which is adapted to slidably receive bolt 124 and which is, in effect, an extension of slot 126 of third leg 48. When easel 50 is juxtaposed on the bottom wall of base 22, the pivotal axes of said first, second and third legs are higher in elevation than is the top surface of easel 50. When the first, second and third legs are in vertical position, the flexible elements are taut and, as stated above, effectively constrain easel 50 in parallelism with the focal surface of a camera mounted on lid 24. When the first, second and third legs are horizontal, the flexible elements are loose and do not interfere with the collapsing of said first, second and third legs over the top surface of easel 50. Movement of easel 50 is facilitated by finger hole 132 into which an operator may insert his finger to raise and lower the easel 50.

The upper surface of easel 50 is adapted to mount an object to be photographically copied. The upper surface of easel 50 may be composed of a soft, elastic material, such as cork, capable of receiving thumbtacks without injury so that the object to be copied may be securely but temporarily fastened on said easel. On the top surface of easel 50 are a plurality of graduated rectangles 134 (Fig. 4), having a common geometrical center, which rectangles enable an operator to readily visually position an object at the center of easel 50 and at the same time to determine the proper distance of said object from a camera mounted on lid 24 to insure that none of the available image-receiving area of a photosensitive sheet within the camera is wasted. Proper positioning of easel 50 is accomplished by means of scale 136, along an edge of third leg 48, and pointer 138, attached to easel 50, which coact with graduated rectangles 134 to indicate the proper distance of said easel 50 from the lens of a camera positioned on lid 24.

Figure 2:
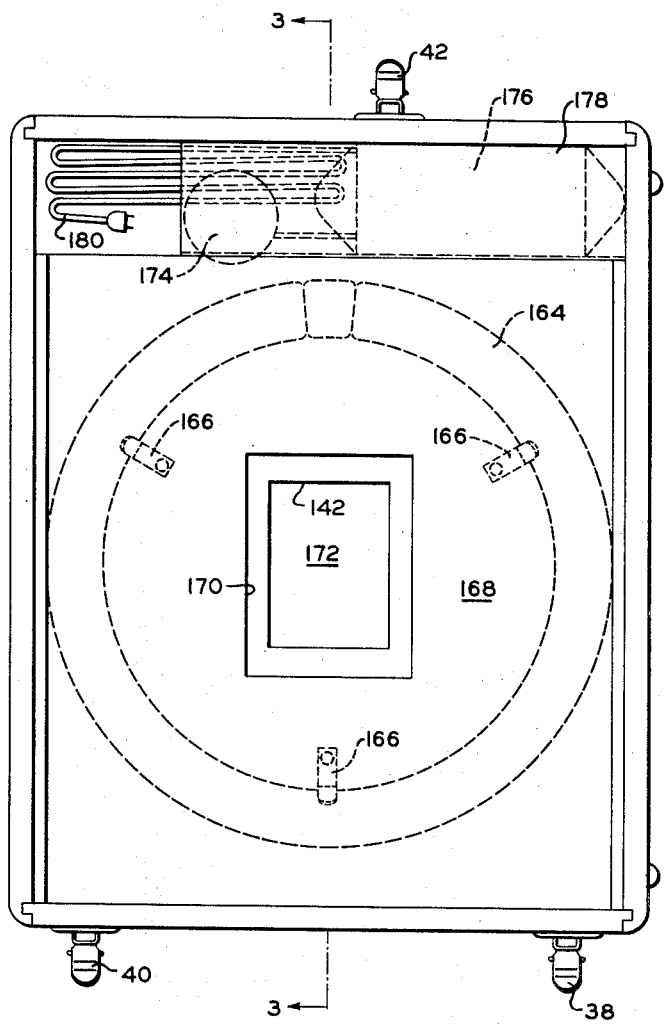
Fig. 2 is a plan view of the lid of the copying stand of Fig. 1, viewing the bottom of said lid.
Figure 3:
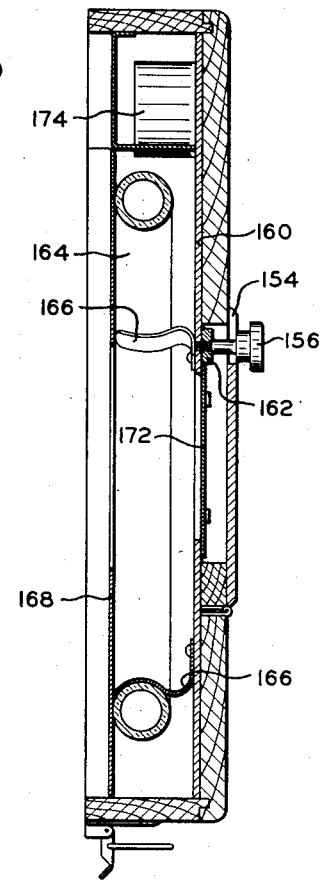
Fig. 3 is a cross section of Fig. 2 taken substantially along the line 3—3.

Referring now to Figs. 1, 2 and 3, lid 24 mounts means for supporting a camera, means for illuminating an object affixed to easel 50 and means providing an optical path which eliminates gloss from light passing from said illuminating means to said object and thence to the lens of said camera.

In the present embodiment, the camera supporting means comprises hatch 140, which, as viewed in Fig. 1, is adapted to mount a camera when in vertical or extended position and is adapted to protect the optical aperture 142 (Fig. 2) through the top of lid 24 when said hatch is in horizontal or collapsed position. Hatch 140 is pivoted to the top of lid 24 by means such as hinge 144 (Fig. 3). Hatch 140 (Fig. 1) may be secured in vertical position by means such as links 146 which are pivoted to the top of lid 24 as at 148. Links 146 have pins 150 on their free ends which ride in slots provided by rails 152, which rails are mounted on opposite sides of hatch 140 and which rails are adapted to be locked in position at the lower ends of said slots by means of notches (not shown). Hatch 140 is provided with an elongated slot 154 (Figs. 1 and 2) in which a locking means, such as bolt 156, is mounted, said bolt 156 and guide members or shoulders 158 being adapted to secure a camera to said hatch when said hatch is in vertical position. Plate 160 is attached to the lower surface of the top wall of lid 24 and is provided with aforementioned optical aperture 142 which permits light to pass from an object affixed to easel 50 to the lens of a camera positioned on hatch 140. When hatch 140 is in horizontal position, bolt 156 is adapted to screw into threaded bore 162 affixed to plate 160 in order to lock said hatch 140 in horizontal position.

Lid 24 preferably mounts means for illuminating an object affixed to easel 50 and for eliminating gloss. It is well known that light falling upon a subject is reflected in two components known as specular and diffuse. The specular component produces what is known as gloss and reflects an image of the light source. The diffuse component is reflected in all directions and does not reflect an image of the light source. It is desirable in photographic copying to prevent the specular component from reaching the lens of a copying camera and, at the same time, to permit the diffuse component to reach said lens without appreciable attenuation. This desired result is accomplished in the preferred copying stand by means of two polarizing elements or sheets. A first polarizing sheet polarizes light falling on the object being copied from the illuminating source. The specular component of this light remains polarized when reflected by the object and is eliminated by means of a substantially crossed polarizing element positioned between said object and said lens.

The source of light in the present embodiment of the herein disclosed invention is a circular or curved fluorescent lamp 164 which is mounted by means of clamps 166 on the lower side of the top of lid 24 in the manner shown in Fig. 2. Polarizing element 168 is attached to the side wall of lid 24 and is positioned below fluorescent lamp 164. The center of polarizing element 168 is cut away, as at 170, to enable light reflected from an object affixed to easel 50 to enter aperture 142 without passing through polarizing element 168. A second polarizing element or sheet 172 is positioned in optical aperture 142, the axes of extinction of said first and second polarizing elements being oriented substantially at right angles to each other, i. e., substantially crossed. Thus, light from fluorescent lamp 164 is polarized when passing through said first polarizing sheet 168 and strikes a flat object affixed to easel 50, the polarized light striking said object being reflected in two components, the specular component being polarized and the diffuse component being unpolarized. The polarized specular component reflected from said object is absorbed by second polarizing sheet 172. Although a portion of the diffuse component is absorbed by second polarizing sheet 172, a large percentage of this diffuse component is transmitted by polarizing sheet 172 and reaches the lens of the camera secured to hatch 140, the light finally reaching said camera lens being virtually free of gloss.

Lid 24 also may support an exposure timer 174 and a trigger start ballast 176 for the fluorescent lamp 164, both of conventional design. Shield 178, one side of which is attached to the side wall of lid 24 and the opposite side of which is attached to polarizing sheet 168, hides the base of the exposure timer and the trigger start ballast from view and additionally serves as a receptacle for cord 180, which is adapted to connect the exposure timer 174 and the trigger start ballast 176 to a power supply.

In operation, beginning with the collapsed condition of the portable copying stand, locking means 32, 34, 36 are disengaged from reciprocal locking means 38, 40 and 42 and lid 24 is removed from juxtaposition on base 22. The first, second and third legs 44, 46 and 48 then are pivoted to their vertical positions and are secured in said vertical positions by their respective locking and interlocking means. Lid 24 then is fitted onto the upper extremities of said first, second and third legs and locked thereupon. An object to be photographically copied may now be affixed to easel 50 by means of thumbtacks, and easel 50, which has been resting on the bottom wall of base 22, may now be raised to a desired elevation. Graduated rectangles 134, scale 136 and pointer 138 serve to give an immediate visual indication of the proper elevation of the easel 50 with respect to the lens of a camera mounted on hatch 140. Hatch 140 may be opened to its vertical position for the reception of a copying camera. Fluorescent lamp 164 now may be switched on and the device is ready for operation. When the preferred portable copying stand is to be collapsed, the above steps are reversed.

Although the apparatus described herein is believed to possess novel advantages, certain modifications thereof are considered to be within the scope of the present invention. In particular, the circular fluorescent lamp 164, although it produces particularly good results, may be replaced by an illuminating source of a different kind. Furthermore, it is contemplated that either of the first and second polarizing sheets, or both, may be rotatably supported so that the angle between the axes of extinction of said first and second sheets may be adjusted.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A stand for use in photographic copying comprising a base, first means for mounting a camera, a plurality of elongated legs, each leg having a pair of opposite ends, one end of said pair being pivoted to said base for movement between a first position in which each said leg is generally parallel with respect to said base and a second position in which each said leg is generally vertical with respect to said base, the other end of said pair being adapted to support said first means above said base when each said leg is in said second position, said first means including a wall, an easel, second means for constraining said easel for movement along each said leg when each said leg is disposed in said second position, said movement being such that said easel is continuously in parallelism with respect to said wall, said wall having an aperture therethrough, the axis through the geometrical center of said aperture being perpendicular to said wall, a first polarizing element in said aperture, a circular fluorescent tube between said easel and said wall, said circular fluorescent tube having an axis of curvature which coincides with said first-mentioned axis, a second polarizing element positioned between said circular fluorescent tube and said easel, said second polarizing element having an opening therethrough in the vicinity of the intersection of said first-mentioned axis and said second polarizing element, the axes of extinction of said first and second polarizing elements being substantially crossed, whereby the specular component of light emitted from said source of illumination and reflected by an object affixed to said easel is substantially prevented from reaching the lens of said camera through said first polarizing element.

2. A stand for use in photographic copying comprising a base and a lid, a plurality of legs, each leg having a pair of opposite ends, one end of said pair being pivoted to said base for movement between a first position in which each said leg is generally parallel with respect to said base and a second position in which each said leg is generally vertical with respect to said base, the other end of said pair being adapted to support said lid above said base when said leg is in said second position, an easel, means for permitting the disposal of said easel between each said leg and said base when each said leg is in said first position and for constraining said easel for movement along each said leg when each said leg is in said second position, said movement being such that said easel is continuously in parallelism with respect to said base, said means comprising a plurality of flexible members each extending from one extremity of one of said legs across said easel to the other extremity of another of said legs, said lid having an aperture therethrough, a first polarizing element mounted in said aperture, a source of illumination between said easel and said lid, and a second polarizing element associated with said lid and positioned between said easel and said source of illumination, said lid shielding said first polarizing element from the predominant proportion of light emanating directly from said source of illumination, the axes of extinction of said polarizing elements being substantially crossed, whereby the specular component of light emanating from said source of illumination and reflected by an object affixed to said easel is substantially prevented from reaching the lens of said camera.

3. A stand for use in photographic copying comprising a base and a lid, a plurality of legs for supporting said lid above said base, each of said legs having a lower extremity pivotally secured to said base and an upper extremity secured to said lid, an easel supported by said legs, means for sliding said easel along said legs and for constraining said easel to permit movement in parallelism with respect to said base, said means comprising flexible members, each of which extends from the lower extremity of one of said legs to one end of said easel, thence across said easel to another end of said easel, thence to the upper extremity of another of said legs, means on said lid for supporting a camera, and an aperture in said lid through which light reflected by an object affixed to said easel may be received by said camera.

4. A stand for use in photographic copying comprising a base and a lid, said base and said lid having walls along their edges, said base and said lid forming a container when the free ends of said walls are aligned and juxtaposed, a plurality of legs, each leg having one free extremity and one extremity pivoted to said base, each leg being adapted to pivot from a position substantially parallel to said base to a position substantially vertical to said base, said legs, when in parallel position, being adapted to be confined within said container, said legs, when in vertical position, being adapted to support said lid, at least one first locking member supported by said base, at least one first reciprocal locking member supported on said lid, said first locking member and said first reciprocal locking member being adapted to interlock when the free ends of said walls are aligned and juxtaposed, a second locking member adjacent the free end of one of said legs, a second reciprocal locking member adjacent the pivoted end of one of said legs, said first locking member being adapted to interlock said second reciprocal locking member and said second locking member being adapted to interlock with said first reciprocal locking member when one of said legs is in vertical position to secure said lid above said base, an easel supported by said legs, means for sliding said easel along said legs when said legs are in vertical position, associated means for illuminating said easel, and means for supporting a camera in position to photograph an object affixed to said easel.

5. A stand for use in photographic copying comprising a base and a lid, said base and said lid having walls along their edges, said base and said lid forming a container when the free ends of said walls are aligned and juxtaposed, a plurality of legs, each leg having one free extremity and one extremity pivoted to said base, each leg being adapted to pivot from a position substantially parallel to said base to a position substantially vertical to said base, said legs, when in parallel position, being adapted to be confined within said container, said legs, when in vertical position, being adapted to support said lid, means for locking said legs in vertical or horizontal position, an easel supported by said legs, means for sliding said easel along said legs when said legs are in vertical position, associated means for illuminating said easel, said lid having an optical aperture therethrough, and a hatch pivotally connected to said lid, said hatch being adapted to protect said optical aperture when in closed position and being adapted to support a camera adjacent said optical aperture when in open position.

6. A stand for use in photographic copying comprising a base and a lid, said base and said lid having walls along their edges, said base and said lid forming a container when the free ends of said walls are aligned and juxtaposed, a plurality of legs, each leg having one free extremity and one extremity pivoted to said base, each leg being adapted to pivot from a position substantially parallel to said base to a position substantially vertical to said base, said legs, when in parallel position, being adapted to be confined within said container, said legs, when in vertical position, being adapted to support said lid, means for locking said legs in either vertical or horizontal position, an easel supported by said legs, means for sliding said easel along said legs when said legs are in vertical position, a source of illumination attached to said lid between said easel and the lens of a camera mounted on said lid, a first polarizing element mounted on said lid between said source of illumination and said lens, a second polarizing element mounted on said lid between said source of illumination and said easel, the axes of extinction of said polarizing elements being substantially crossed whereby the specular component of light emitted from said source of illumination and reflected by an object affixed to said easel is substantially prevented from reaching said lens.

7. A stand for use in photographic copying comprising a base and a lid, said base and said lid having walls along their edges, said base and said lid forming a container when the free ends of said walls are aligned and juxtaposed, a plurality of legs, each leg having one free extremity and one extremity pivoted to said base, each leg being adapted to pivot from a position substantially parallel to said base to a position substantially vertical to said base, said legs, when in parallel position, being adapted to be confined within said container, said legs, when in vertical position, being adapted to support said lid, means for locking said legs in either vertical or horizontal position, an easel supported by said legs, means for sliding said easel along said legs when said legs are in vertical position, said lid having an optical aperture therethrough, a hatch pivotally connected to said lid, said hatch being adapted to protect said optical aperture when in closed position and being adapted to support a camera adjacent said optical aperture when in open position, a source of illumination attached to said lid between said easel and the lens of a camera secured to said hatch, a first polarizing element mounted in said optical aperture between said source of illumination and said lens, a second polarizing element mounted on said lid between said source of illumination and said easel, the axes of extinction of said polarizing elements being substantially crossed whereby the specular component of light emitted from said source of illumination and reflected by an object affixed to said easel is prevented from reaching said lens.

8. A stand for use in photographic copying comprising a base and a lid, a plurality of legs for supporting said lid above said base, each of said legs having a lower extremity pivotally secured to said base and an upper extremity adapted to be secured to said lid, an easel, sheaves at opposite ends of said easel, and means for constraining motion of said easel along said legs, said means comprising flexible members, each of which extends from the lower extremity of one of said legs to one of said sheaves at one of said ends of said easel, thence across said easel to another of said sheaves on another of said ends of said easel, thence to the upper extremity of another of said legs.

9. A stand for use in photographic copying comprising a base and a lid, said base comprising a face portion and a raised wall portion bounding said face portion, said lid comprising a face and a raised wall portion bounding said face portion, a plurality of legs for supporting said lid above said base, each of said legs having a lower extremity pivotally secured to said base and an upper extremity adapted to be secured to said lid, an easel, a plurality of sheaves at opposite ends of said easel, means for constraining motion of said easel along said legs, said means comprising flexible members, each of which extends from the lower extremity of one of said legs to one of said sheaves on one of said ends of said easel, thence across said easel to another of said sheaves on another of said ends of said easel, thence to the upper extremity of another of said legs, and means on said lid for supporting a camera, said base and said lid being adapted to form a container for said easel and said legs when said raised portions are aligned and juxtaposed, said lid being provided with an aperture through which light reflected by an object affixed to said easel may be received by said camera.

References Cited in the file of this patent

UNITED STATES PATENTS

| Number | Name | Date |
|---|---|---|
| 196,591 | Moss | Oct. 30, 1877 |
| 714,594 | Marx | Nov. 25, 1902 |
| 1,127,231 | Gregory | Feb. 2, 1915 |
| 1,633,658 | Brown | June 28, 1927 |
| 1,635,014 | Smith | July 5, 1927 |
| 1,687,069 | Iser | Oct. 9, 1928 |
| 1,793,837 | Caps | Feb. 24, 1931 |
| 2,001,378 | Cornwall | May 14, 1935 |
| 2,018,963 | Land | Oct. 29, 1935 |
| 2,102,008 | Klitsche | Dec. 14, 1937 |
| 2,186,330 | Fitzgerald | Jan. 9, 1940 |
| 2,251,335 | Hargreaves | Aug. 5, 1941 |
| 2,388,192 | Stechbart | Oct. 30, 1945 |

FOREIGN PATENTS

| Number | Country | Date |
|---|---|---|
| 254,541 | Italy | Aug. 5, 1927 |